(12) United States Patent
Sims

(10) Patent No.: US 6,705,510 B1
(45) Date of Patent: Mar. 16, 2004

(54) VALVE HOUSING FABRICATION PROCESS ENABLING COMPLETE COVERAGE OF JOINT SURFACES WITH PROTECTIVE COATING

(76) Inventor: James O Sims, 1100 Brooks St., Decatur, AL (US) 35601

( * ) Notice: Subject to any disclaimer, the term of this patent is extended or adjusted under 35 U.S.C. 154(b) by 138 days.

(21) Appl. No.: 10/095,185

(22) Filed: Mar. 11, 2002

(51) Int. Cl.⁷ .................................................. B23K 37/02
(52) U.S. Cl. ........................ 228/175; 228/135; 228/157
(58) Field of Search ................................. 228/135, 136, 228/137, 157, 173.1, 173.4, 175, 176, 225, 226, 227, 229, 245–262

(56) References Cited

U.S. PATENT DOCUMENTS

| | | | | |
|---|---|---|---|---|
| 1,103,630 A | * | 7/1914 | Stewart ................... | 285/288.1 |
| 2,297,554 A | * | 9/1942 | Hardy et al. ............. | 228/56.3 |
| 3,290,772 A | * | 12/1966 | Crouch ...................... | 228/135 |
| 3,442,009 A | * | 5/1969 | Shellman et al. .......... | 228/160 |
| 3,503,631 A | * | 3/1970 | Greever ..................... | 285/21.1 |
| 3,667,109 A | * | 6/1972 | Alcenius ..................... | 228/215 |
| 4,272,006 A | * | 6/1981 | Kao ............................ | 228/183 |
| 4,347,966 A | * | 9/1982 | Feutrel ...................... | 228/173.4 |
| 4,423,890 A | * | 1/1984 | Hackett et al. ............. | 285/189 |
| 5,100,047 A | * | 3/1992 | Nakagawa et al. ......... | 228/176 |
| 6,371,359 B1 | * | 4/2002 | Kimura et al. ............. | 228/175 |

* cited by examiner

Primary Examiner—M. Alexandra Elve
Assistant Examiner—Len Tran
(74) Attorney, Agent, or Firm—Joseph H. Beumer

(57) ABSTRACT

A value housing having overlapped inner and outer members is fabricated by a process including placing the members in position where one side of the joint is accessible for welding and the opposite side is inaccessible, single welding from the accessible side and brazing the opposite side. The brazing step provides for filling of minute gaps in the joint at the inaccessible side. A bronze welding type brazing alloy and heating at a temperature of 1800 to 1900 degrees Fahrenheit are employed.

5 Claims, 1 Drawing Sheet

VALVE HOUSING FABRICATION PROCESS ENABLING COMPLETE COVERAGE OF JOINT SURFACES WITH PROTECTIVE COATING

FIELD OF THE INVENTION

This invention relates to metal joining processses and more particularly to elimination of gaps formed in inaccessible areas of welded joints.

BACKGROUND OF THE INVENTION

Housings for certain valves, in particular valves for use in large metal water pipe systems for underground applications, have a structure which includes an inner tubular pipe portion and an outer generally tubular portion coaxial with the inner portion and overlapped over a set distance adjacent to an end of the inner pipe, the outer tubular portion being spaced apart radially a substantial distance from the inner pipe at the overlapped inner pipe end and tapered inwardly so as to come into contact with and to be joined to the inner pipe at the opposite end of the overlapped portion. The inwardly tapered end of the outer pipe may be joined to the inner pipe surface by welding performed from the outside surface of the outer pipe, this side of the joint being readily accessible to necessary welding equipment. While a single welded joint applied in this manner may meet initial requirements relating to strength and water-tight capability, a long-term problem is presented owing to the adverse effect of such a joint not obtaining complete coverage of inside surfaces with a protective coating. Use of double welding wherein a second welding step performed along the inside surface of the outer pipe would not be feasible owing to the cramped available space. For example, access at a forty-five degree angle, as required to lay down a fillet for a back-side welded joint, is unavailable in this structure.

A protective coating applied to inside surfaces of the valve housing is required to prevent corrosion as would occur in carbon steel pipes exposed to water. Coatings for this purpose typically comprise a baked powder coating applied by air bath. When applied to joint surfaces at a backside location at a single-welded joint, coatings of this type may fail to provide complete coverage of surfaces inside of minute gaps along the backside of the joint interface. This lack of complete penetration of the coating is believed to result from the coating being electrostatically attracted to one side or the other before it gets to the corner. In effect the exposed surfaces within gaps create a latent defect, shortening the service life of the valve housing.

SUMMARY OF THE INVENTION

The present invention is directed to a process for fabricating a valve housing wherein an inner tubular steel member is joined to an outer steel member, the outer member disposed generally coaxial with the inner member and having an end portion overlapping the inner member, and the end portion being tapered inward so as you come into contact with an inner end of the overlapped area. The two members are joined by being placed in aligned position with a side edge surface of the outer member in contact with a mating surface of the inner member, welding the members together by means of a single weld applied from the direction of the outside surface of the outer member and treating the joint area on the side opposite to the single weld to remove gaps at the juncture of the inner side of the outer member and the inner member. After removal of gaps, a protective coating is then applied to surfaces of the housing to prevent corrosion.

Treatment of the juncture area opposite from the single welded side to remove gaps may be carried out by a brazing step performed after welding of the accessible side or by obtaining a high precision fit between the joining members prior to welding by means of shrink-fit or mechanical press-fit techniques.

"Brazing" as used herein is intended to refer to a group of welding processes wherein the filler metal is a nonferrous metal or alloy whose melting point is higher than 1000 degrees Fahrenheit, but lower than that of the metals or alloys to be joined.

Further details regarding specific filler metals and process conditions are given below. Terminology used in describing applicable process is consistent with information disclosed in Van Nostrand's Scientific Encyclopedia, Fourth Edition at page 236, and attributed to the American Welding Society.

Brazing may be carried out by placement of a suitable alloy having a melting point below the melting point of the steel members in position around the periphery of the single-welded joint and in position to move into gaps at the backside of the welded juncture by capillary action and/or gravity and diffusion. Heating the assembly to a temperature such as 1800 to 1900 degrees Fahrenheit in an induction furnace may be used for this purpose.

A high-precision gap-free backside juncture may also be obtained by use of a shrink-fitting procedure wherein the joint areas of the members are machined to a tolerance such as 0.010 to 0.020 inch and the outer member is caused to expand by being heated to a high temperature and, while expanded is moved in place over the inner member, which is not heated, but may instead be cooled. Upon allowing the outer member to cool, an effective interference fit is obtained.

Removal or prevention of gaps at joint areas in a welded valve housing in accordance with this invention enables complete coverage of interior housing surfaces with protective coatings as are required for prevention of corrosion. Long term service life of the housing is thus enhanced.

It is therefore an object of this invention to provide a process wherein gaps in inaccessible backside areas of single welded joints are avoided.

Another object is to provide a process for fabricating valve housings from overlapped tubular steel members wherein inaccessible backside areas of welded joints are treated to remove minute gaps.

Another object is to provide a process for fabricating valves for water pipe service wherein complete coverage of housing surfaces with a protective coating is enabled.

Other objects and advantages of the invention will be apparent from the following detailed description of the appended claims.

DESCRIPTION OF THE PREFERRED EMBODIMENT

Figure 1:
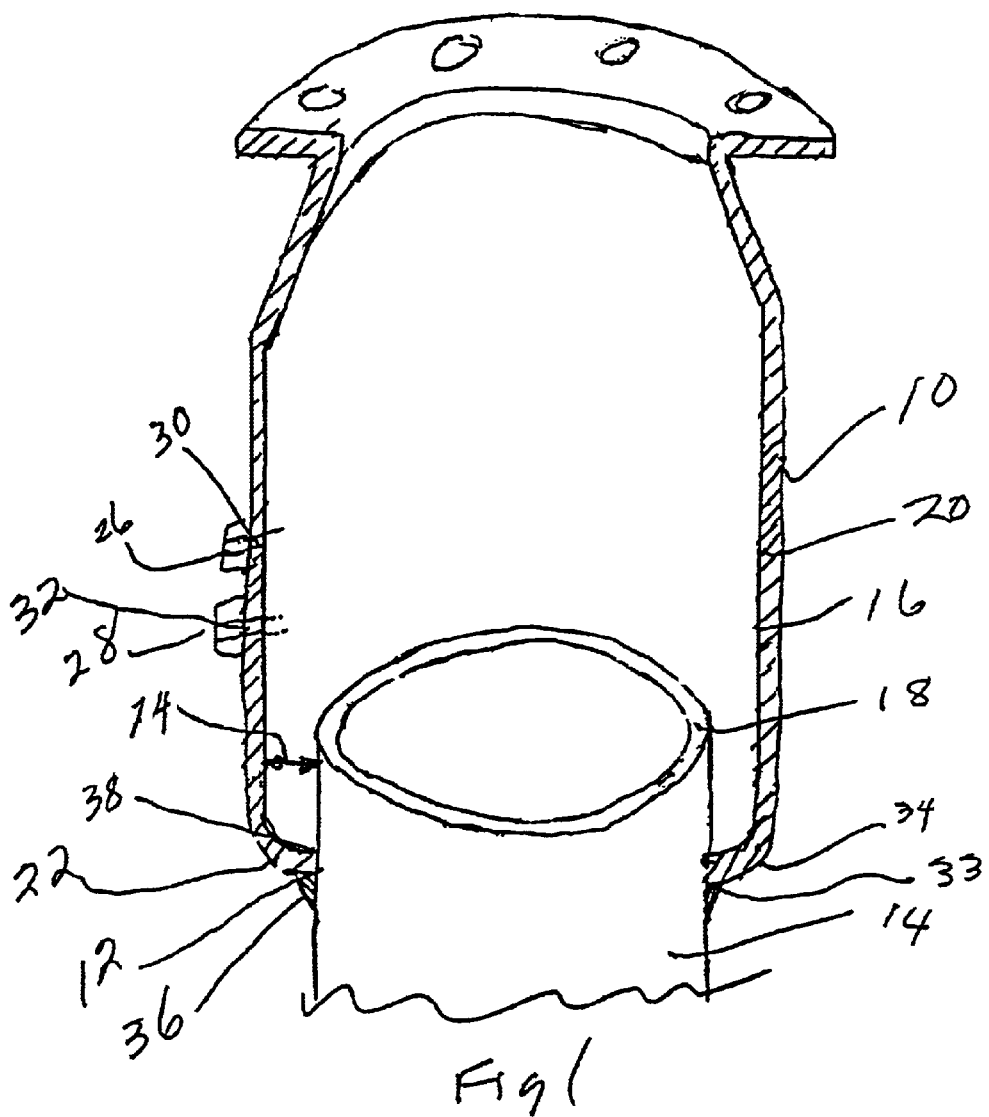
FIG. 1 is a side view, partly cut away and partly in section, showing a valve housing joint prepared by a process embodying the invention.
Figure 2:
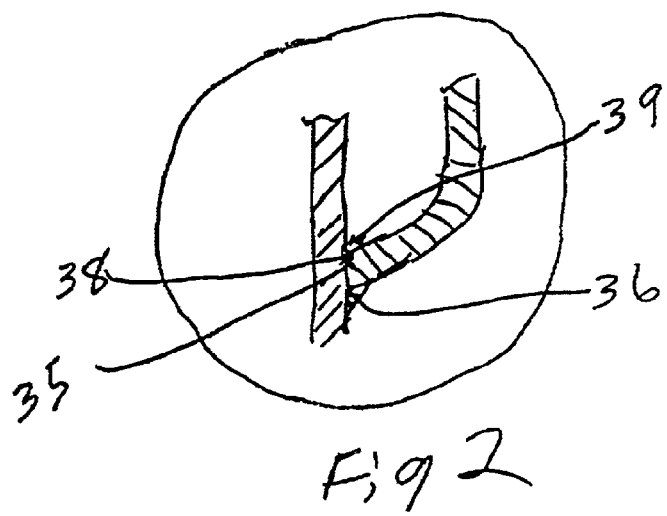
FIG. 2 in an enlarged sectional view showing a joint welded on an outer, accessible side, with a filler material in position for performing a brazing step on the inner side thereof.

Referring to FIG. 1 of the drawings, there is shown a valve housing 10 having a joint 12 between an inner tubular member 14 and an outer member 16. The joint extends around the circumference of inner pipe 14 at a set distance apart from end 18 thereof. Outer member 16 has a generally tubular portion 20 disposed coaxial with the inner pipe and an inwardly curved end portion 22 extending downward and inward to joint 12. Portion 20 of the outer member is spaced outward a selected distance 24 to provide space for placement of a rotary component of the valve (not shown), as supported by bolts 26, 28 mounted in holes 30, 32.

Inner member 14 and outer member 16 are connected by being single welded at edge 33 of outer surface 34 of the outer member, with a fillet 36 formed at the lower side of joint 12. Welding of the joint from the opposite, inner surface of the outer member would not be feasible using conventional welding in which a fillet is formed, owing to the limited space available for access of necessary equipment inside the tapered cavity. In the absence of further treatment according to this invention minute gaps 35 would be present around the upper side of joint 12 at edge 38 of portion 22 of outer member 16. Such gaps present a problem in that protective coatings used to prevent corrosion would fail to provide complete coverage of surfaces inside the gaps.

In a preferred process for joining the inner and outer members to form the structure described above, mating surfaces of the members are first machined and are brought into contact and supported in such position as by framework connected to the outer member at holes 30, 32. A single welding step performed from the outside 34 of outer member 16 is then carried out, using conventional MIG type welding and forming a fillet 36 at the joint. Other types of welding methods such as TIG may also be used.

Removal of gaps from the upper, unwelded side of joint 12 may then be accomplished by brazing, using a suitable filler material along the top side of the joint and applying sufficient heat to cause the material to be moved into the bottom of the cavity defined by the inner and outer members whereby gaps in the backside of the joint are filled. Various types of brazing materials have been developed for use on different base metals at different temperature ranges. At lower temperatures silver-containing alloys may be used in a manner similar to ordinary soldering, in what is commonly called "silver soldering" or "hard soldering," alloys for this purpose melting in a range of 1175 to 1500 degrees Fahrenheit. Another type of brazing is "copper brazing" wherein pure copper is used at higher temperatures such as 2050 degrees Fahrenheit. Brazing spelter using an alloy of equal proportions of zinc and copper melting at 1600 degrees Fahrenheit is also available. While any of these materials and processes may be used in the present process, it is preferred to use a type of brazing called "bronze welding," modified as may be required. In bronze welding the joints are generally of the V or fillet types in which a bead of filler metal is deposited with a torch. In the present process the filler metal is preferably placed in position in the form of a wire disposed around the circumferance of the housing above the upper side of the single welded joint.

The technique differs from welding in that the base metal is not melted but only raised to the "tinning" temperature at which bonding takes place between the base metal and the brass or bronze filler metal by slight interdiffusion or alloying. The filler metals most widely used are brasses of the 60% copper-40% zinc type with additions of tin, iron, manganese, or silicon. For some purposes special bronzes are used such as aluminum bronze, silicon bronze, and nickel silver. The melting points of all of these alloys are higher than those of the silver solders but lower than that of pure copper. A preferred specific filler material having a composition of 92.8% copper and 7.3% phosphorus is available under the name "Phos Copper", as identified by American Welding Society. Brazing with this filler material may be carried out by heating the housing at temperature of 1800 to 1900 degrees Fahrenheit. Other filler material compositions may require other temperatures for optimum results. In general a temperature under 2000 degrees Fahrenheit is effective. Heating may be performed in an induction furnace.

Upon completion of brazing, the housing is in condition for application of a protective coating using previously known coating materials and processes as referred to above. Elimination of gaps at inaccessible areas of the housing joint provides assurance of complete coverage of surfaces exposed to water in service. While the invention is described above in terms of specific embodiments, it is not to be understood as so limited, but is limited only as indicated by the appended claims. In particular, other types of filler materials in addition to those described may also be used.

I claim:

1. The process of joining a first, inner tubular steel member to a second outer generally tubular steel member in overlapping relation with said first member, said outer member at a lower end of an overlapping portion being brought into flush contact with said first member, said outer member in a position such that an upper side edge at said outer member is inaccessible to welding equipment and an opposing lower side edge of said outer member is accessible to welding equipment, said process comprising:

welding said members together at a juncture of said lower side edge and a wall of said inner member adjacent thereto, whereby a single weld along said lower side edge is formed and gaps remain at an opposing juncture along said upper side edge;

providing a brazing alloy in position above said opposing juncture and around a circumference thereof; and heating the resulting assembly to an elevated temperature whereby said alloy is caused to move into said gaps and cover all exposed steel surfaces therein.

2. The process as defined in claim 1 wherein said brazing alloy is a bronze welding alloy.

3. The process as defined in claim 2 wherein said brazing alloy has a composition of 92.8 percent copper 7.3 percent phosphorous.

4. The process as defined in claim 1 wherein said temperature is from 1800 to 1900 degrees Fahrenheit.

5. The process as defined in claim 1 wherein said assembly is heated in an induction furnace.

* * * * *